United States Patent
Shoolman

(10) Patent No.: US 8,075,168 B1
(45) Date of Patent: Dec. 13, 2011

(54) BICYCLE SAFETY LIGHTS FOR DAY AND NIGHT

(76) Inventor: Carl Lee Shoolman, Columbus, OH (US)

( * ) Notice: Subject to any disclaimer, the term of this patent is extended or adjusted under 35 U.S.C. 154(b) by 301 days.

(21) Appl. No.: 12/348,001

(22) Filed: Jan. 1, 2009

Related U.S. Application Data

(60) Provisional application No. 61/018,649, filed on Jan. 2, 2008.

(51) Int. Cl.
*B62J 6/00* (2006.01)

(52) U.S. Cl. .......................................................... 362/473

(58) Field of Classification Search .......... 362/473–476; 340/432
See application file for complete search history.

(56) References Cited

U.S. PATENT DOCUMENTS

| | | | |
|---|---|---|---|
| 3,944,255 A | 3/1976 | Martinson | |
| 3,945,336 A | 3/1976 | Harris | |
| 3,972,302 A | 8/1976 | Sherman | |
| 3,982,771 A | 9/1976 | Tropeano | |
| 4,027,150 A | 5/1977 | Dean | |
| 4,038,935 A | 8/1977 | Margiloff | |
| 4,049,959 A * | 9/1977 | Ledterman | 362/473 |
| 4,051,361 A * | 9/1977 | Lichon et al. | 362/211 |
| 4,088,882 A | 5/1978 | Lewis | |
| 4,103,924 A | 8/1978 | Suhm | |
| 4,116,154 A | 9/1978 | Harris | |
| 4,204,191 A * | 5/1980 | Daniels | 340/432 |
| 4,575,189 A | 3/1986 | Johnson | |
| 4,598,339 A * | 7/1986 | Ainsworth | 362/540 |
| 4,711,381 A | 12/1987 | Felder | |
| 4,875,142 A | 10/1989 | Spector | |
| 5,379,197 A | 1/1995 | Conyers | |
| 5,652,677 A | 7/1997 | Burison | |
| 5,872,510 A * | 2/1999 | O'Shaughnessy | 340/468 |
| 5,933,073 A * | 8/1999 | Shuey | 375/258 |
| 6,805,473 B2 * | 10/2004 | Beard | 362/474 |
| 6,925,654 B2 | 8/2005 | De Silva | |
| 6,976,446 B2 | 12/2005 | Manzano | |
| 2005/0213338 A1 | 9/2005 | Roberts | |
| 2006/0158890 A1 | 7/2006 | Freedman | |
| 2007/0014119 A1 | 1/2007 | Burkett | |
| 2007/0035956 A1 | 2/2007 | Topps | |
| 2007/0063831 A1 | 3/2007 | Perkins | |
| 2007/0285934 A1 | 12/2007 | Carillo | |
| 2007/0291475 A1 | 12/2007 | Heathcock | |

(Continued)

FOREIGN PATENT DOCUMENTS

WO   WO/00/46097   8/2000

(Continued)

OTHER PUBLICATIONS

Busch & Muller. "World's first daytime running light for bicycles" Aug. 20, 2010. Press release. Germany www.pd-f.de/en/2001-Daten/100901-D04-03-Licht24-Tagfahrlicht.html.

(Continued)

*Primary Examiner* — Stephen F Husar
*Assistant Examiner* — James Cranson, Jr.

(57) ABSTRACT

Conspicuous, informative lights make bicycling on roads safer and more comfortable, day and night. Pairs of bright, non-flashing, non-glare lights are positioned so motorists can easily detect and recognize the bicycle, then easily determine its space requirements and motion. They also light the road ahead at night. In one embodiment, thin clusters of LED's shine white ahead and amber rear, giving the bicycle a wide presence on the road. This keeps motor vehicles at a safe distance and decreases motorist impatience.

1 Claim, 8 Drawing Sheets

U.S. PATENT DOCUMENTS

Figure 1:
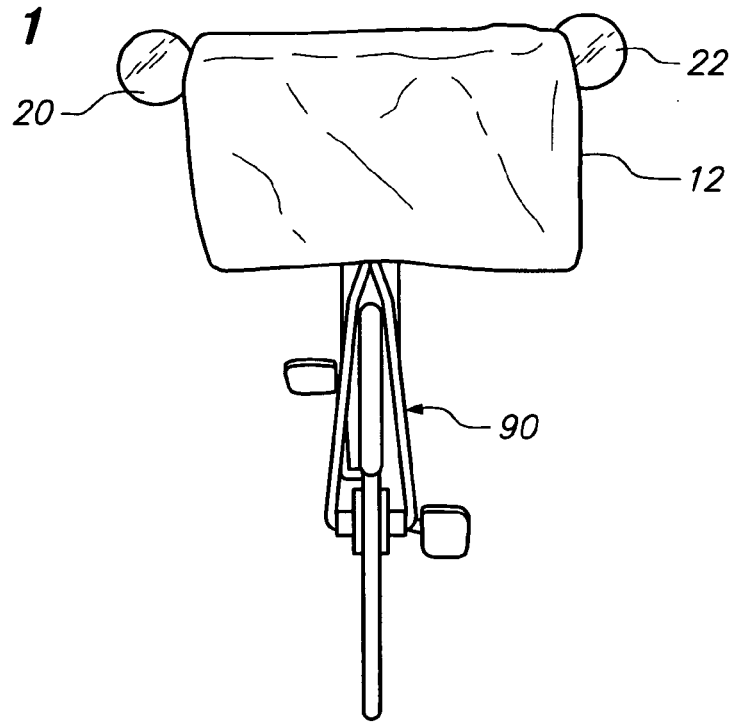

| | | |
|---|---|---|
| 2008/0023934 A1 | 1/2008 | van Houweling |
| 2008/0062007 A1 | 3/2008 | Kimbrough |
| 2008/0136660 A1 | 6/2008 | Bailey |
| 2008/0170382 A1 | 7/2008 | Mass |
| 2008/0219014 A1 | 9/2008 | Loibl |
| 2008/0266838 A1 | 10/2008 | Lin |

FOREIGN PATENT DOCUMENTS

| | | |
|---|---|---|
| WO | WO/01/33700 | 5/2001 |
| WO | WO/03/105314 | 12/2003 |
| WO | WO/2006/086987 A2 | 8/2006 |
| WO | WO/2008/071198 | 6/2008 |
| WO | WO/2008/101507 | 8/2008 |

OTHER PUBLICATIONS

Busch & Muller. "Daytime running light for bicycles" Aug. 14, 2010. Press release. Germany. www.peterwhitecycles.com/Downloads/B&M_Licht24.doc.

* cited by examiner

BICYCLE SAFETY LIGHTS FOR DAY AND NIGHT

RELATED APPLICATION

This application claims the benefit of provisional patent application Ser. No. 61/018,649, receipt date 2008 Jan. 2, by the present inventor.

FIELD

This application relates to bicycle safety on roads, particularly lights for day and night, front and back, making a bicycle conspicuous and enabling motorists to assess its space requirements, position and movement. The lights also illuminate the road ahead at night.

BACKGROUND

Bicycling on roads is scary and dangerous. Motor vehicles come too close when passing. They turn into the bicycle's path at intersections. Motorists show impatience. Some bicyclists are frightened, injured and killed.

Some experts advise bicyclists to "take the lane," positioning the bicycle so it occupies the full traffic lane, like other slow-moving vehicles. This helps, but motorists still have difficulty seeing the bicycle in the middle of the lane. They cannot easily determine its location, speed and direction. They underestimate how much space the bicyclist needs to feel comfortable, driving into narrow lanes along side the bicycle.

Existing bicycle safety systems do not fix these problems. Flags, reflectors, narrow-beam LED headlights and flashing lights are inherently hard to see or dazzling or disorienting. In daylight, the lights are not big or bright enough. A single headlight or tail light does not provide the two steady, separated light points needed to determine the bicycle's position and motion. Lights are typically too low, small or dim to catch motorists' attention. The lights or extensions are not wide enough to keep motorists from crowding into the bicyclist's lane.

The present inventor modified an existing nightlight in about 1973 so that two bright four-inch round lights extended from handlebars on both sides of the bicycle. He used the lights in daytime as well as night. The handlebar lights were deficient because, among other reasons, they moved whenever the handlebars were turned and because they were too low to shine directly at motorists. Recently, he discovered that these problems were fixed by moving the lights to the position described for these embodiments. (That discovery was within one year of filing his provisional patent application; this application does not cover lights on handlebars or recumbent seat rails.)

ADVANTAGES

Pairs of lights, day and night, front and back, make the bicycle conspicuous. To motorists the bicycle appears to fill its traffic lane. In addition to showing the way at night, the lights are designed and positioned so that motorists can quickly and accurately determine the bicycle's location, direction and speed. This reduces crashes, scary encounters and motorist impatience, making road cycling more safe and comfortable.

These are unexpected and substantial benefits from having two non-flashing, non-glare, bright lights in each direction and placing them wide apart, very high and always aligned with the bicycle frame.

SUMMARY

These bicycle lights enable and encourage motorists to drive at a safe distance, so bicyclists can travel safely and comfortably on roads.

A bright, non-glare, non-flashing light extends from each side of a bicycle. They shine white light ahead and amber behind. They are conspicuous day and night, and in rain, fog and snow. They are far enough apart that motorists understand how much space the bicycle needs to be safe. They are high enough to be conspicuous and enable motorists to easily judge the bicycle's position, direction and speed. They also show the road at night.

[This summary describes one embodiment.]

DRAWINGS

Figures

Figure 2:
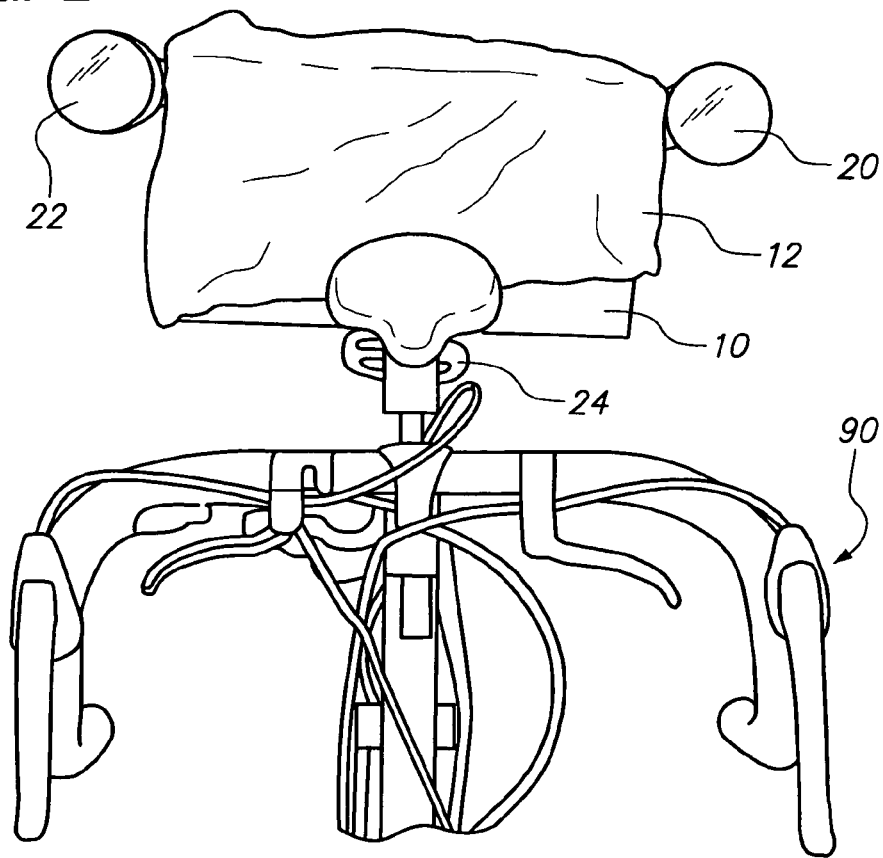
Figure 3:
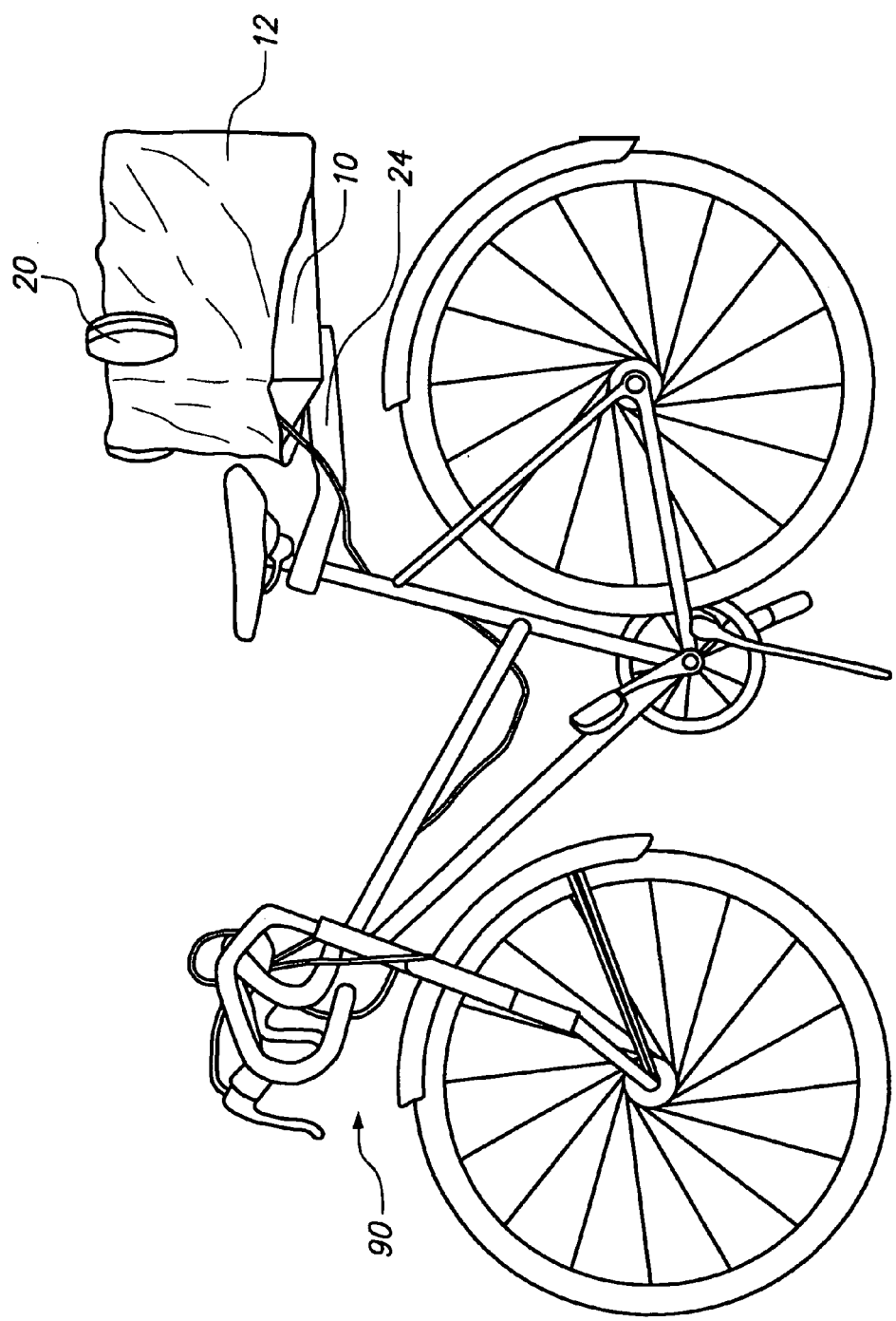
Figure 4:
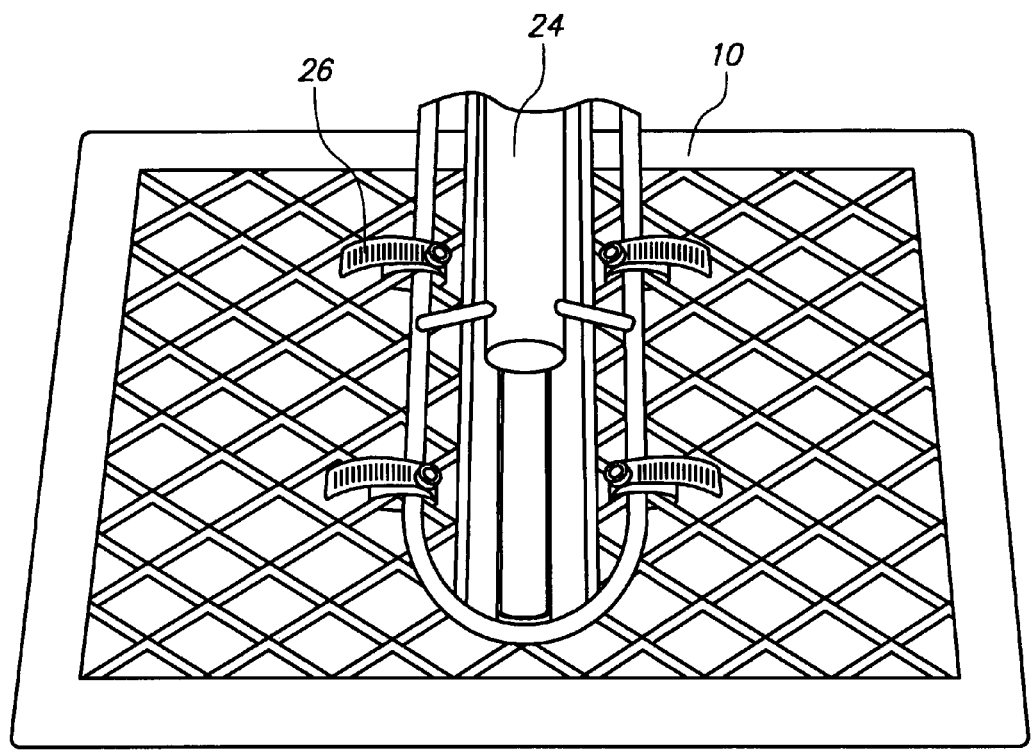
Figure 5:
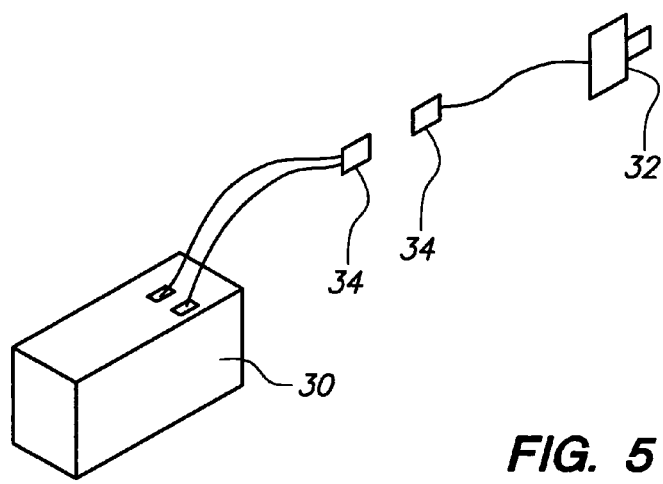
Figure 6:
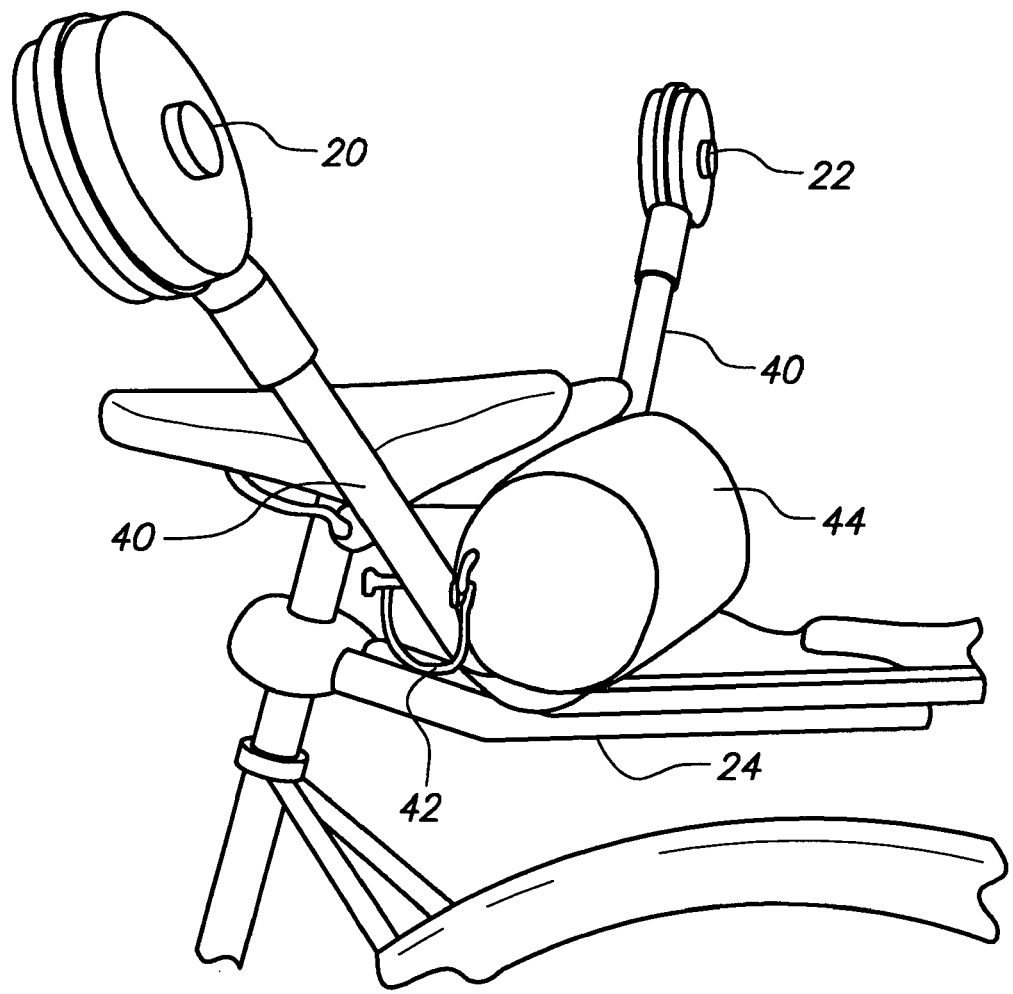
Figure 7:
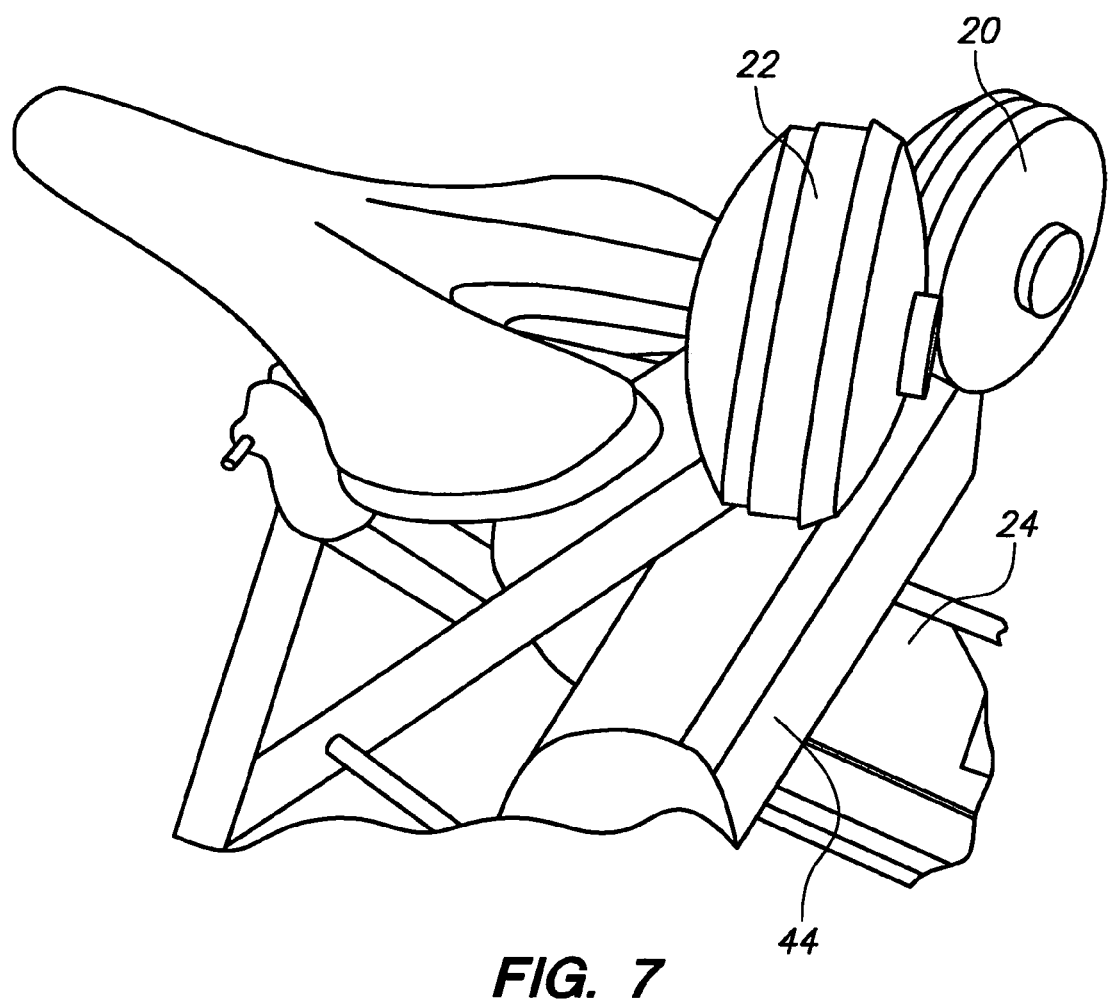
Figure 8:
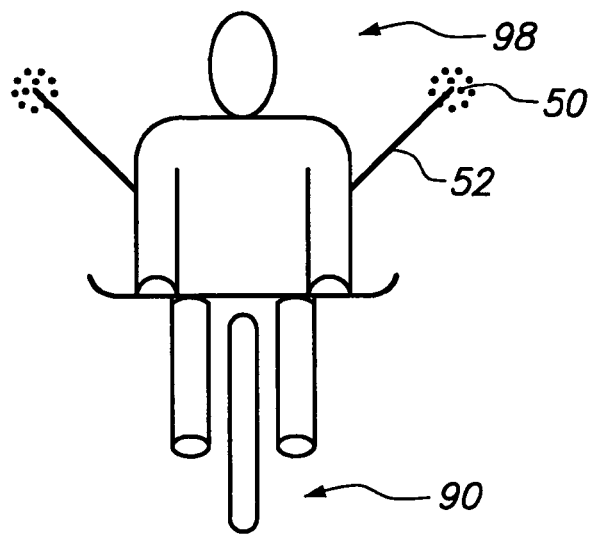
Figure 9:
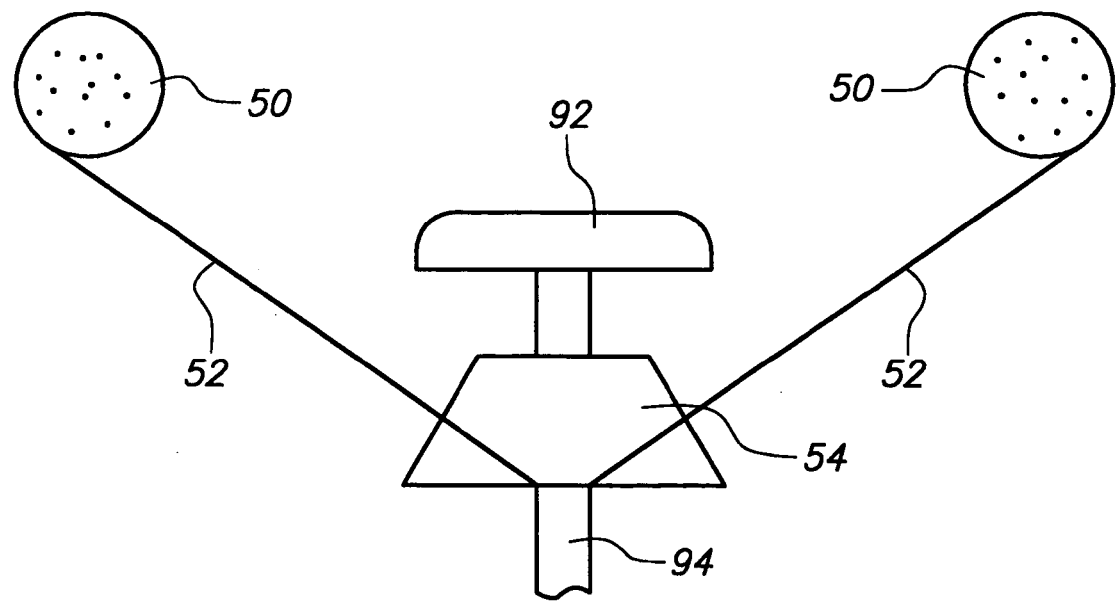
Figure 10:
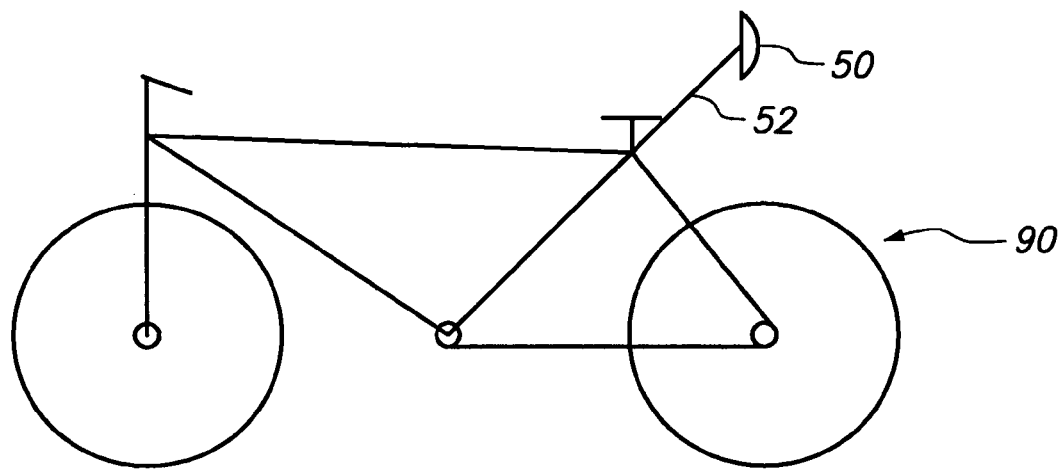
Figure 11:
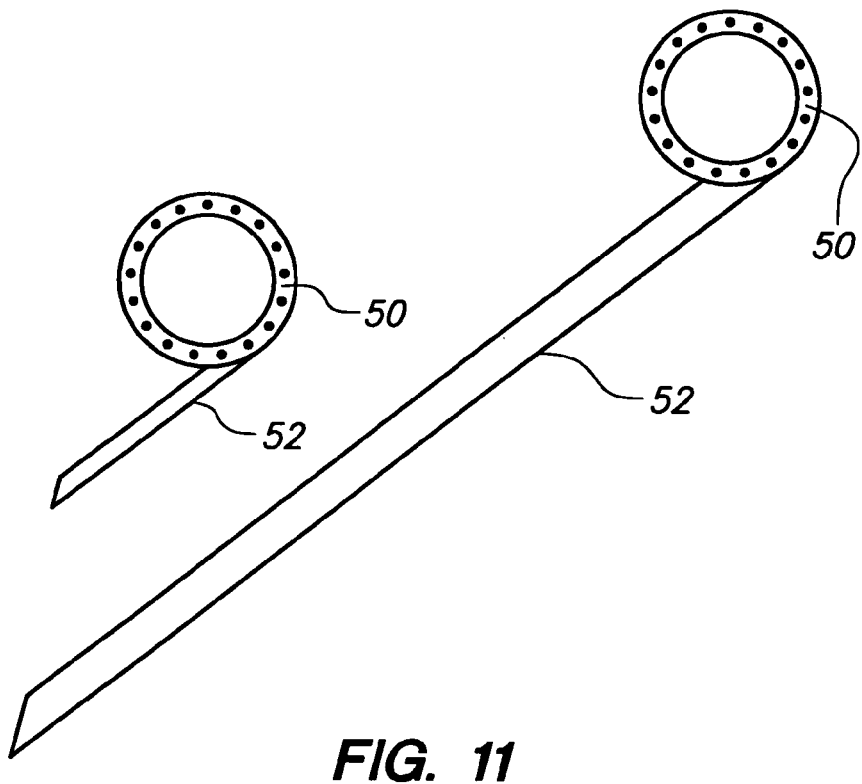
Figure 12:
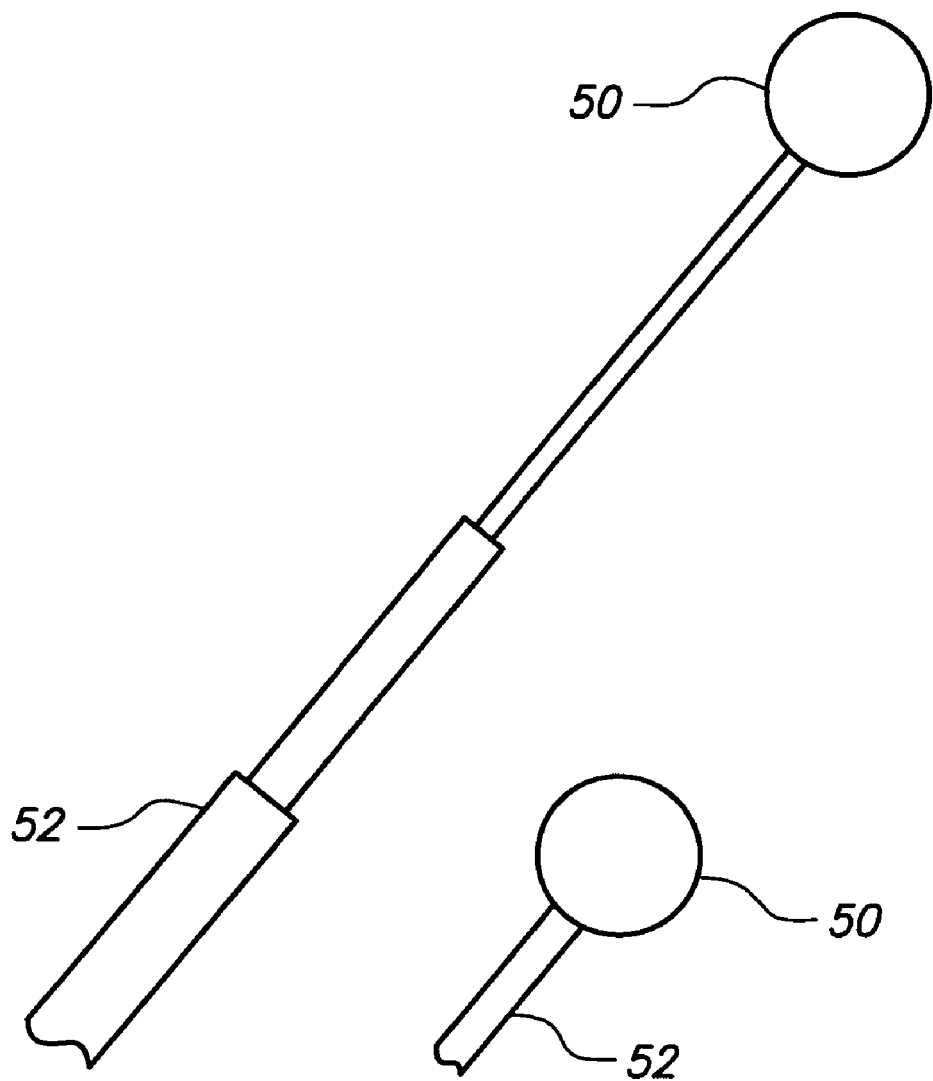

FIG. 1 shows the back of the box, with either bulbs or LED's.
FIG. 2 shows the front.
FIG. 3 shows the side.
FIG. 4 shows the bottom.
FIG. 5 shows the battery and charger.
FIG. 6 shows tubes replacing the box.
FIG. 7 shows the tubes folded.
FIG. 8 shows LED or optic fiber lights from front.
FIG. 9 shows them from the back, on the seat post.
FIG. 10 shows them from the side.
FIG. 11 shows a roll-up support in both positions.
FIG. 12 shows a retractable support in both positions.

REFERENCE NUMBERS

10 rectangular milk crate
12 bag covering crate
20 light on bicyclist's left
22 light on bicyclist's right
24 luggage rack
26 clamp
30 battery
32 charger
34 connector
40 tube
42 pin
44 battery bag
50 light cluster
52 cluster support
54 support, battery
90 bicycle
92 bicycle seat
94 seat post
98 bicyclist

DETAILED DESCRIPTION

Structure

As shown in FIGS. 1, 2 and 3, two double-faced truck pedestal turn signal lights 20, 22 are attached by nuts to a rectangular plastic box (24-quart milk crate) 10.

The lights have bulbs (#1157; 12 volt automotive turn signals) with two filaments. The wire for the bright filament is used for the light on the bicyclist's left; the wire for the other filament is used for the light on the bicyclist's right. The second wire from the battery to each light is attached to the lock washer on each.

The lights have Fresnel lenses and show white light forward and amber back. The box and lights are sized and positioned so that the lenses can be seen from the front, beyond to the bicyclist's body.

As shown in FIG. 4, the box is attached to the bicycle's rear luggage carrier rack 24 with at least four all-stainless-steel hose clamps holding together the railing of the rack and the open grid of the bottom of the box. 26.

As seen on FIG. 5, wire connects the lights to a quick-connector (polarized, durable, shock-resistant; Powerpole® 15 amp) 34.

A battery (12 volt, 5 amp hours Absorbent Glass Mat, F2 tabs) 32. uses quick disconnect connectors (0.250 size) to the wire that ends with a connector 34 matching the connector to the lights. All wires are color coded and matched for polarity.

A battery charger (12 volt, 800 mA, automatic sealed lead acid battery charger; class 2) 32 has wire to connectors 34 matching the battery.

Operation

Day or night, the bicyclist turns on the lights on the bicycle by plugging in the recharged battery, then pedals down the road.

The bicyclist "takes the lane" by positioning the bike directly ahead of motorists, in the left tire track of the right lane.

A motorist behind sees conspicuous amber lights extending on each side of the bicycle, making it clear that there is not enough room for the motor vehicle to drive next to the bicycle in the same lane. Using the two steady points of light, the motorist easily determines the bicycle's position, speed and direction. The motorist treats the bicycle like any slow moving vehicle, waiting patiently behind until there is an opportunity to pass safely.

A motorist approaching from the front sees two conspicuous white headlights filling the bicycle's lane. The motorist easily determines the bicycle's position, speed and direction from the pair of steady lights. The motorist coordinates the car or truck with the bicycle, just as with any other slow moving vehicle.

The lights are clearly visible, but not blinding, in bright sunlight and darkness. They are effective in rain, fog and snow.

ALTERNATIVE EMBODIMENTS

Second Embodiment

Round LED

This changes the First Embodiment by replacing the incandescent lights with LED's providing substantially the same size and brightness as its brighter (left) light. The appearance of the lights remains almost the same as in FIGS. 1, 2, 3, 4 and 5. The light from LED's is diffused, by lenses or other measures to eliminate glare. The size and type of battery is changed to match the reduced energy consumption.

The lights will operate longer on each charge (or before replacement of non-rechargeable batteries.) The battery will also weigh less.

Third Embodiment

Tubes

This changes the First or Second Embodiment by replacing the crate supporting the round incandescent lights with tubes (such as PVC and ABS conduit) attached to the bicycle frame (front or back), seat or luggage rack. See FIG. 6. For stability, the tubes are glued together and prevented from rotating by a screw passing through the tube and the front of the luggage rack. The tubes can be collapsed for parking and storage. See FIG. 7. They are held together at one point by, for example, only by a removable round lock pin. 42 The battery may be enclosed in a bag under the seat or a luggage container attached to the bicycle or luggage rack.

This makes the lighting system appear less heavy and bulky and more attractive.

Fourth Embodiment

LED Ring

This changes the First Embodiment by replacing the crate supporting the lights with lightweight, thin strips, tubes or other shapes as shown in FIGS. 8, 9 and 10. The LED's may be in that support or in another shape attached to it. This is attached to the bicycle seat post, frame or rack, as shown on FIG. 9. The material is strong enough to position the LED's in a steady position. There are enough LED's to provide substantially as much light as the brighter (left) light in the First Embodiment. The LED's are positioned into any pattern that provides that much light. The support may retract, as shown on FIGS. 11 and 12. It may contain the battery or the battery may be in a separate container. The LED's may be enclosed or supported by any suitable materials in any appealing shape.

A conspicuous ring or pattern of LED's extends from each side of the bicycle, supported by an almost invisible, almost weightless strip. It rolls or retracts into the bicycle for easy parking and storage. The support may be a flexible stainless steel spring that is stable either extended or rolled (like a slap bracelet) or another appealing material, as shown in FIG. 11.

Fifth Embodiment

Optic Fibers

This changes the Fifth Embodiment by replacing the LED's with optic fibers or other visually appealing, but still effective, means of producing two conspicuous, non-glaring, large points of light on either side of the bicycle, visible from.

Many points of light seem to hang in space, collectively making an effective single light, as shown on FIGS. 8 and 9.

Sixth Embodiment

Batteries

This changes the First Embodiment by replacing the battery, based on balancing the users' preference for weight, cost, energy capacity, light types, re-charging, availability, size, discharge profile and other characteristics.

Battery types include Absorbent Glass Mat, lithium, nickel-metal hydride, nickel-cadmium, gel and alkaline. They may be single-use or rechargeable.

Other Embodiments

The embodiments of the invention have been described by way of example and many other modifications and developments may be made to them within the scope of the present invention. These include dimensions, materials, shape, color and design.

The invention claimed is:
1. A safety illumination system for bicycles comprising:
a structure extending outward from said bicycle beyond the handlebars of said bicycle on the right side of said bicycle and on the left side of said bicycle,
said structure is not attached to said handlebars;
a lighting fixture supported by said structure on the right side of said bicycle and a lighting fixture on the left side of said bicycle;
said structure is attached to said bicycle such that said lighting fixtures are consistently positioned relative to a frame of said bicycle regardless of handlebar rotation, and said lighting fixtures comprise lights visible from forward of said bicycle and rearward of said bicycle.

* * * * *